United States Patent [19]

Kijima

[11] Patent Number: 4,646,582

[45] Date of Patent: Mar. 3, 1987

[54] OPERATING DEVICE FOR TRANSMISSION

[75] Inventor: Nobuo Kijima, Tokyo, Japan

[73] Assignee: Mitsubishi Jidosha Kogyo Kabushiki Kaisha, Tokyo, Japan

[21] Appl. No.: 508,481

[22] Filed: Jun. 27, 1983

[51] Int. Cl.$^4$ ............................................. B60K 20/00
[52] U.S. Cl. .................................. 74/473 R; 74/475; 74/491
[58] Field of Search ...................... 74/475, 473 R, 491

[56] References Cited

U.S. PATENT DOCUMENTS

| | | | |
|---|---|---|---|
| 1,976,309 | 10/1934 | Thompson | 74/475 |
| 2,373,745 | 4/1945 | Conway | 74/491 X |
| 2,745,506 | 5/1956 | McCallum | 74/491 X |
| 3,054,302 | 9/1962 | Cone | 74/475 |
| 3,128,635 | 4/1964 | Doolittle | 74/475 X |
| 4,070,914 | 1/1978 | Reinhardt et al. | 74/475 |
| 4,275,613 | 6/1981 | Worner et al. | 74/475 |
| 4,344,334 | 8/1982 | Schmittbetz et al. | 74/473 R |
| 4,444,072 | 4/1984 | Grimes et al. | 74/473 R |
| 4,458,550 | 7/1984 | Takahashi | 74/473 R |
| 4,507,601 | 3/1985 | Andresen | 74/491 X |
| 4,507,736 | 3/1985 | Klatt | 74/475 X |

FOREIGN PATENT DOCUMENTS 4746734 11/1972 Japan .
55-176826 12/1980 Japan .

Primary Examiner—Larry Jones
Attorney, Agent, or Firm—Robert E. Burns; Emmanuel J. Lobato; Bruce L. Adams

[57] ABSTRACT

An operating device in which a speed change operation performed by a manual operating member is boosted by electric energy or hydraulic pressure or the like and transmitted to the transmission, wherein if an operator moves the manual operating member to perform the speed-change operation, a high reaction force is applied against the movement of the manual operating member by an interference device until the speed change condition of the transmission has reached the one desired and in turn when the speed-change condition of the transmission reaches the one desired, operation of the interference means is controlled by a control means, resulting in applying a low or no reaction force in respect to the movement of said manual operating member, thereby the operator can be apprised of the completion of the speed-change operation of the transmission through a rapid decrease in resistance to operation of the manual operating member, and upon completion of the speed-change operation, the operator may direct his efforts to other operating functions without being concerned with the speed change operation. Since a tactual sense of the operator is applied to detect a completion of the speed-change operation of the transmission, his sense of sight and hearing can be applied to assuring safety in running operation of the vehicle or the like and thereby a quite safe operation of the vehicle can be assured.

12 Claims, 12 Drawing Figures

OPERATING DEVICE FOR TRANSMISSION

BACKGROUND OF THE INVENTION

1. Field of the Invention

This invention relates to an operating device for a transmission.

2. Description of the Prior Art

Recent types of manual transmission for a large-sized vehicle such as a bus or truck have been provided with an operating device in which a manual speed-change operation of the transmission is boosted by electric energy or hydraulic pressure etc. and transmitted to the transmission so as to facilitate the speed-change operation of the transmission.

One example of these prior art devices will be described with reference to FIGS. 1 to 3.

Figure 1:
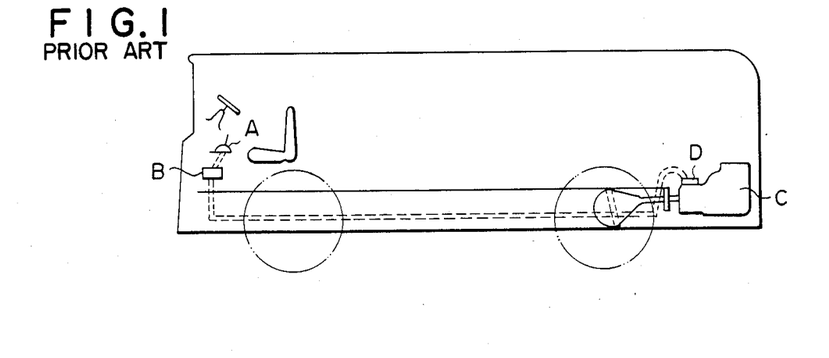
FIG. 1 is a schematic illustration for showing one example of a conventional operating device for a transmission for performing a speed-change operation with booster means.

The device shown in FIG. 1 is for a bus, wherein it is composed of an instruction unit A located at the driver's seat, a signal processing unit B having relay circuits or the like and a gear-shift unit D arranged at the transmission C.

Figure 2:
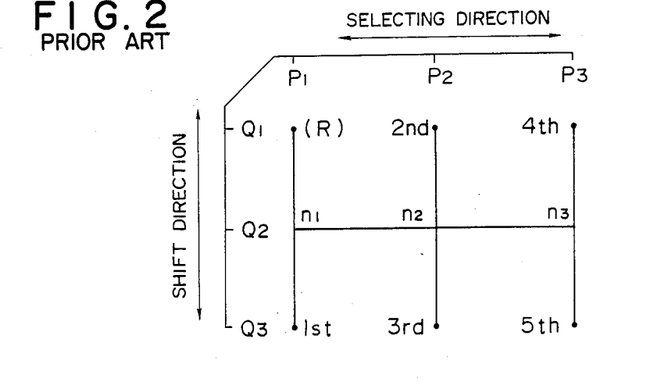
FIG. 2 is a schematic view for showing a shift selection pattern for gears corresponding to the device shown in FIG. 1.
Figure 3:
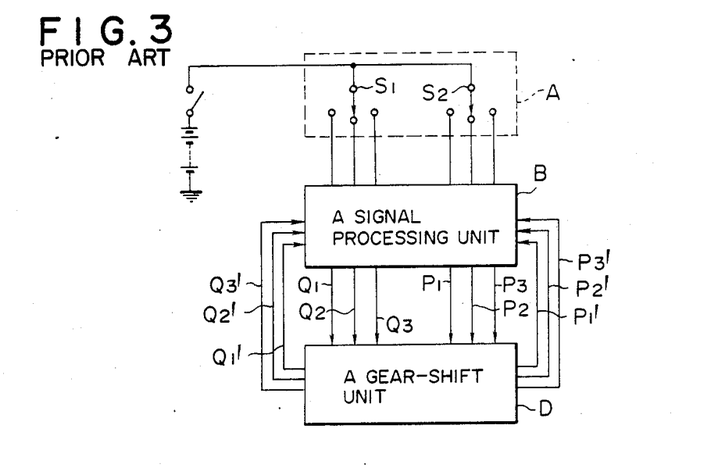
FIG. 3 is a schematic electric circuit diagram for the device shown in FIG. 1.

In the instruction unit A, the switches $S_1$ and $S_2$ acting as a signal generating means shown in FIG. 3 are operated by operating the manual operating member to a speed-change position corresponding to the shift pattern shown in FIG. 2. In this case, the switch $S_1$ indicates a shift direction $Q_1$, $Q_2$ and $Q_3$ of said shift pattern and the switch $S_2$ indicates the positions of selecting direction $P_1$, $P_2$ and $P_3$ in the pattern and their signals are fed to the gear-shift unit D constituting a booster device after they are processed in the signal processing unit B.

The gear-shift unit D has a solenoid valve which is operated by the signals and a power cylinder supplied with air under pressure from an air tank through the solenoid valve so as to operate a selection fork or a shift fork of the transmission and varies the engagement condition of the transmission C in an order of the selecting direction and then a shift direction in reference to an output signal from said signal processing unit B which is fed to solenoid valve. The gear-shift unit D is provided with switches for detecting the engaged position of the gears and the signals $P_1'$, $P_2'$ and $P_3'$, and $Q_1'$, $Q_2'$ and $Q_3'$ shown in FIG. 3 from the switches serve as shift completed signals and then selecting completed signals to the signal processing unit B so as to cut off the output signals $P_1$, $P_2$ and $P_3$, and $Q_1$, $Q_2$ and $Q_3$ from the signal processing unit B. When the transmission is performed for its speed-change operation through booster means such as a gear-shift unit operated under the energy of air pressure or the like, the operator does not operate the transmission directly and the force required for operating the speed-change operation is quite low, so that the operator may not sense completion of the speed-change operation of the transmission and sometimes may feel a sense of uneasiness, resulting in affecting an operator's concentration on the driving operations other than the speed-change operation.

SUMMARY OF THE INVENTION

An object of the present invention is to overcome the deficiencies of prior speed-change mechanisms and to provide an operating device for transmission provided with manual operating member movably supported in a supporting member and moving through a passage between each of the speed-change positions, a signal generating means formed midway of such passage and generating an instruction signal corresponding to a speed-change position to which the manual operating member is directed under an engagement with the manual operating member, and a booster means (power servo mechanism) for modifying a speed-change condition of the transmission to one corresponding to the speed-change position to which said manual operating member is directed by means of electric energy, fluid pressure or the like in response to said instruction signal generated by the signal generating means, characterized in that there are arranged interference means engaged with said manual operating member to interfere with movement of the manual operating member and control means for controlling such interference action of said interference means in response to an output of the sensing means for detecting a speed-change condition of the transmission, and when the manual operating member is moved and the speed-change condition of the transmission corresponds to that of the speed-change position of the manual operating member, the interference action of the interference means is controlled.

According to the present invention, it is found that when the operator moves the manual operating member to operate a speed-change operation, a high reaction force acts against the movement of the manual operating member under an action of the interference means until the desired speed-change condition of the transmission is reached, and when the desired speed-change condition of the transmission is reached, the action of the interference means is controlled by a control means, resulting in providing a low reaction or no reaction to the movement of the manual operating member, so that the operator may be apprised of a completion of the speed-change operation of the transmission in response to a rapid smooth operation of the manual operating member and thus the operator may concentrate his efforts on other operating actions without being concerned with the speed-change operation after the completion of the speed-change operation. In this case, an acknowledgement of the completion of the speed-change operation of the transmission may be made through a tactual sense of the operator, so that his sense of sight and hearing may be applied to assuring safety in operation of the vehicle and thus a quite high safety operation can be performed.

DESCRIPTION OF THE PREFERRED EMBODIMENTS

Referring now to the drawings, the preferred embodiments of the present invention will be described.

Figure 4:
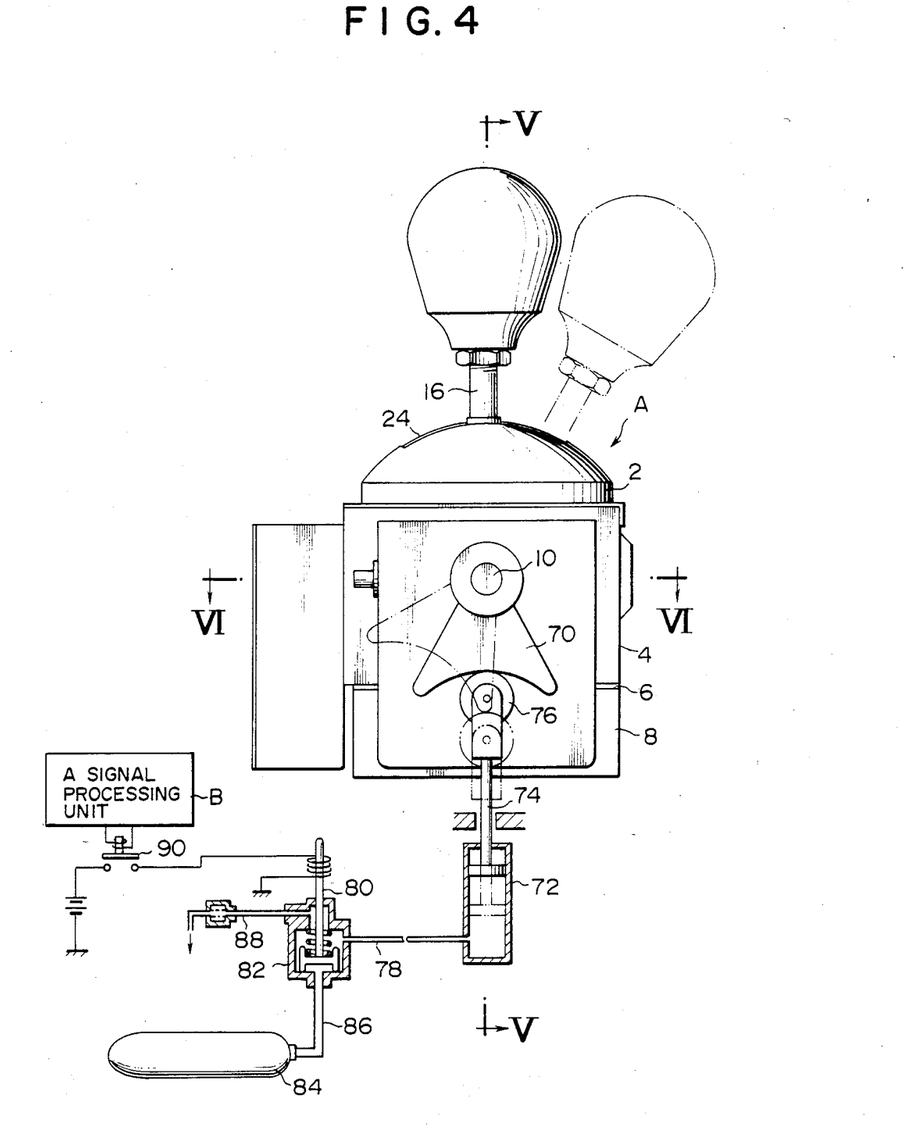
FIG. 4 is an elevational view for showing a first preferred embodiment of the present invention.
Figure 5:
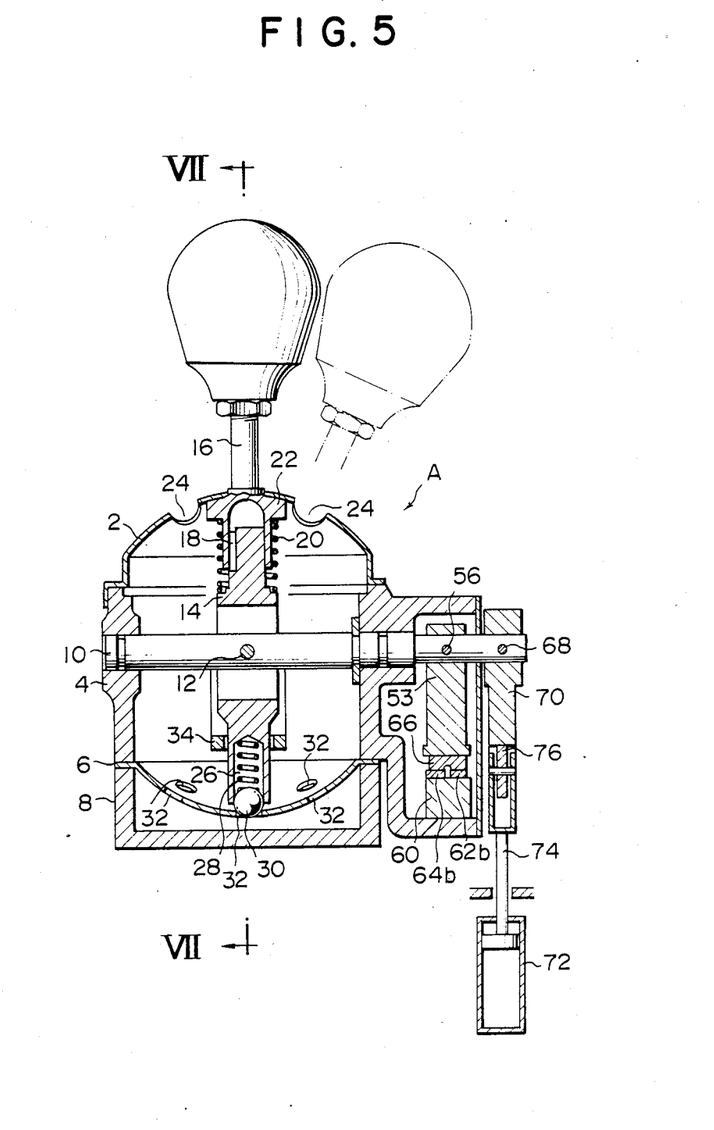
FIG. 5 is a sectional view taken along line V—V of FIG. 4.
Figure 6:
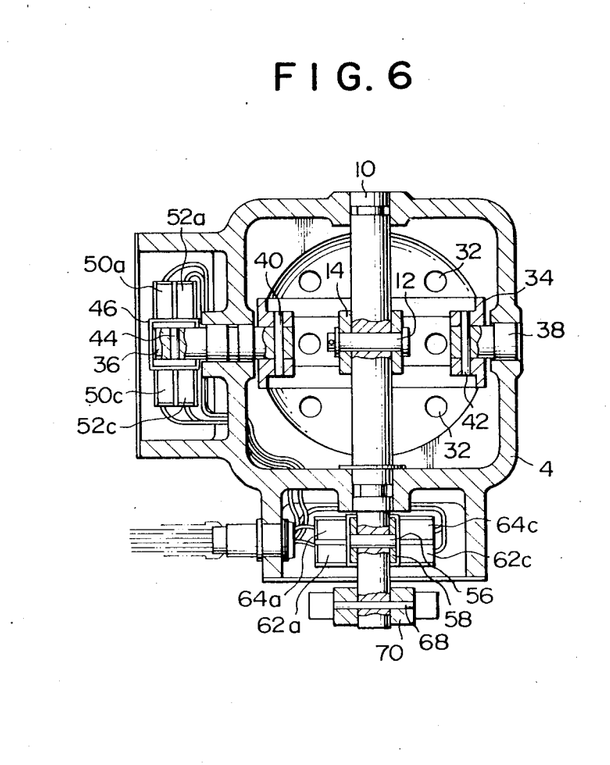
FIG. 6 is a sectional view taken along line VI—VI of FIG. 4.
Figure 7:
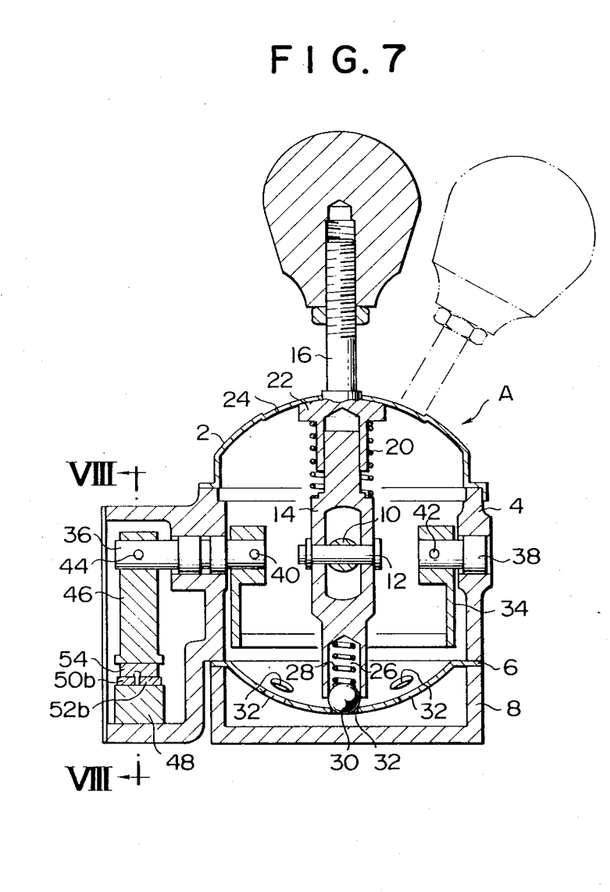
FIG. 7 is a sectional view taken along line VII—VII of FIG. 5.
Figure 8:
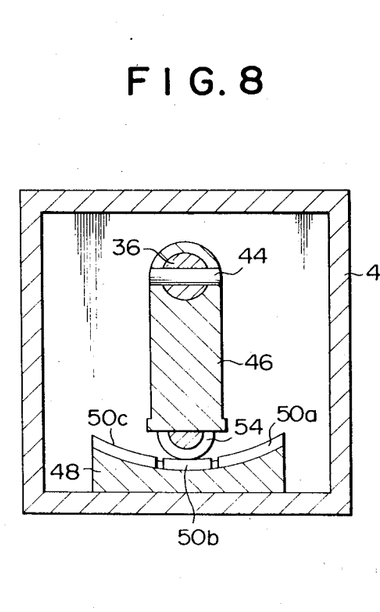
FIG. 8 is a sectional view taken along line VIII—VIII of FIG. 7.

The device of the preferred embodiment described below relates to an operating device for the transmission of a bus as shown in FIGS. 1 to 3, wherein the device is provided with an instruction unit A, a signal processing unit B, a transmission C and a gear-shift unit D. The signal processing unit B, the transmission C and the gear-shift unit D have already been described above, so that their detailed description will be eliminated. The first preferred embodiment of the instruction unit A is constructed as shown in FIGS. 4 to 8, and the reference characters 2, 4, 6 and 8 indicate each of the casing members forming an instruction unit casing, respectively, 10 indicates a shift shaft supported in the casing member 4, 14 indicates a connecting rod pivotally connected to the shift shaft 10 through a pin 12 and extending vertically in the casing, 16 is a lever, the lower end of which is fitted to the upper shaft part of the connecting rod 14 via a key 18 and having its upper head passed through the casing member 2 and projected out of the instruction unit casing. The lever 16 is biased upwardly by a spring 20 and its spherical surface 22 is abutted against the inner surface of the casing member 2. The casing member 2 is made such that its inner surface abutted against the spherical surface 22 of the lever 16 is formed to have a spherical surface having its center at the crossing point of the axis of the shift shaft 10 and the axis of the pin 12 and some guide grooves 24 for use in guiding the lever 16 to the positions corresponding to the shift pattern shown in FIG. 2. That is, the lever 16 is moved through the passage predetermined by the guide grooves 24. The radius of curvature of the spherical surface 22 of the lever 16 is substantially the same as that of the inner surface of the casing member 2. As shown in FIG. 5, when the lever 16 is moved along the guide groove 24 in a selecting direction shown in FIG. 2, the connecting rod 14 is oscillated around the axis of the pin 12 and does not rotate the shift shaft 10 and in turn as shown in FIG. 7 when the lever 16 is moved along the guide groove 24 in a shift direction shown in FIG. 2, the connecting rod 14 is oscilated around the axis of the shift shaft 10. In this case, the shift shaft 10 is rotated along with the connecting rod 14 by the pin 12. A column part at the lower end of the connecting rod 14 is formed with a hole 26, and the hole 26 is provided with a ball 30 abutting against the inner surface of the casing member 6 under a downward directed biasing force of the spring 28. The inner surface of the casing member 6 is formed with a spherical surface around a crossing point of said axes similarly to that of the casing member 2. The ball 30 is moved on the inner surface in response to the movement of the lever 16, and when the lever 16 is moved to each of the speed-change positions corresponding to the shift pattern shown in particular in FIG. 2 under a guidance of the guide groove 24 of the casing member 2, the ball is engaged with each of the engaging holes 32 made in the casing member 6. Reference numeral 34 indicates an oscillating member having two transverse rods extending in parallel to each other with the column part at the lower end of the connecting rod 14 being held therebetween with a clearance and vertical plates connected to each of the left and right ends of the transverse rods shown in FIG. 7, extended upwardly and engaged with the shafts 36 and 38 supported in the casing member 4 via pins 40 and 42, respectively. With this arrangement, the axes of said shafts 36 and 38 are arranged to be coincided with the axis of the pin 12 and in turn when the lever 16 is moved in said shift direction, said column part is moved in a space between the transverse rods therealong, that is, the oscillating member 34 is not oscillated. In turn, when the lever 16 is moved in said selecting direction, said column part is abutted against either one of said transverse rods to cause the oscillating member 34 to be oscillated and the oscillating movement of the oscillating member 34 performed in this way causes the shafts 36 and 38 to be rotated via pins 40 and 42. To the left end of the shaft 36 as viewed in FIG. 7 is connected an oscillating body 46 via pin 44, and as shown in FIGS. 6 to 8, at the lower end of the oscillating body 46 as viewed in FIG. 7 is arranged a movable contact point 54 which constitutes an electric switch under a cooperation with the fixed contact points 50a, 50b, 50c fixed to the casing member 4 through the block member 48 and the fixed contact points 52a, 52b, 52c corresponding to said fixed contact points 50a, 50b, 50c. When the lever 16 is moved in said selecting direction to cause the oscillating member 46 to be oscillated via oscillating member 34 and the shaft 36, the movable contact point 54 causes either one set of the fixed contact points 50a and 52a or 50b and 52b or 50c and 52c to be connected, and this operation corresponds to a change-over operation of the switch $S_2$ in FIG. 3. In turn, also to the right end of the shift shaft 10 shown in FIG. 5 is connected oscillating member 58 via pin 56 and at the lower end of the oscillating member 58 is fixed a movable contact point 66 which constitutes a switch in cooperation with the fixed contact points 62a, 62b, 62c and 64a, 64b, 64c which are fixed to the casing 4 through the block member 60. The movable contact point 66 is operated such that when the lever 16 is moved in the shifting direction to cause the oscillating member 58 to be oscilatted through the shift shaft 10, the energized parts at the fixed contact points 62 and 64 are, similarly to that of said movable contact point 54, changed over. This operation corresponds to the change-over operation of the switch $S_1$ in FIG. 3. Switching operation of the movable contact point 54 and the fixed contact points 50 and 52 and the switch structure of the movable contact point 66, fixed contact points 62 and 64 are made such that when the lever 16 is moved to the desired selecting position and the shifting position, the switches corresponding to the selecting position and the shifting position of the lever are turned on before it reaches the desired position. To the right end of the shift shaft 10 as viewed in FIG. 5 is fixed a cam body 70 through a pin 68 and to the lower surface of the cam body 70 is, as shown in FIGS. 4 and 5, connected a piston rod 74 of an air cylinder 72 supported on the chassis through a roller 76. To the air cylinder 72 is connected one end of an air passage 78 and the other end of the passage 78 communicates with a valve box 82 in which a solenoid valve 80 is installed. To the valve box 82 are connected a communication passage 86 extending to an air tank 84 of a source of compressed air and a passage 88 opened to the surrounding atmosphere. The solenoid valve 80 operated by a switch 90 is turned on or off in response to a signal sent to the signal processing unit B, and causes the passage 78 to be in communication with the passage 86 when the switch 90 is closed and in turn causes the passage 78 to be in communication with the passage 88 communicating with the surrounding atmosphere when the switch 90 is opened. The switch 90 is operated such that it is closed by the output from the signal processing unit B when the signal generated under an energized condition of the fixed contact point 62b and 64b is fed to the signal processing unit B and in turn it is opened by the output from the signal processing unit B when the signals $Q_1'$ and $Q_3'$ other than those corresponding to the intermediate position in the shift direction selected from the shift completion signals described before in reference to FIG. 3 are fed to the signal processing unit B.

With the arrangement described above, when the lever 16 is at an intermediate position relating to both shift and selecting directions during an operation of the engine, that is, it is located at the position $n_2$ in FIG. 2, the movable contact point 54 energizes the fixed contact points 50b and 52b, the movable contact point 66 energizes the fixed contact points 62b and 64b, and then the transmission C keeps its neutral condition ($n_2$ neutral position). In this case, the switch 90 is kept closed and the air cylinder 72 is supplied with compressed air from the air tank 84. Then, when the lever 16 is moved in a selecting direction and the lever 16 is displaced from $n_2$ to $n_1$ position, that is, when the lever 16 is moved from a solid line position to a dotted line position in FIG. 5, the energized condition with the fixed contact points 62b and 64b is kept due to there being no rotation of the shift shaft 10. In turn, as the oscillating member 34 is oscillated, the oscillating member 46 is oscillated, the movable contact point 54 causes the fixed contact points 50a and 52a to be energized and the selecting fork in the gear-shift unit D causes the engaged condition of the transmission C to be varied to one ($n_1$ neutral position) corresponding to $n_1$ in response to the output from the signal processing unit B. Then, when the lever 16 is moved in a shift direction and the position of the lever 16 is displaced from $n_1$ to the first speed, that is, when the lever 16 is moved from a position indicated by a solid line in FIGS. 4 and 7 to a dotted line position, the shift shaft 10 is rotated to cause the contact points contacting the movable contact point 66 to be displaced from the fixed contact points 62b and 64b to 62a and 64a, reslting in that the shift fork of the gear-shift unit D causes the speed-change condition of the transmission C to be displaced to the first speed. In turn, as the shift shaft 10 is rotated, the cam body 70 is moved from the solid line position shown in FIG. 4 to the dotted line position to cause the piston rod 74 to be descended via roller 76. In this case, since the cylinder 72 is supplied with compressed air from the air tank 84, an increased relative high reaction force acting against the moving operation of the lever 16 is applied to the operator's fingers or hand as the piston rod 74 is descended. Thereafter, when the shift to the first speed condition of the transmission C is completed, the above-mentioned shift completed signal $Q_3'$ is fed to the signal processing unit B, thereby the switch 90 is released, the solenoid valve 80 is moved to cause the compressed air in the cylinder 72 to be discharged to the surrounding atmosphere through the passage 88 communicating with the surrounding air. With this condition, the high reaction force applied to the hand or fingers of the operator is released suddenly and the lever 16 is smoothly and rapidly moved to the position corresponding to the first speed. The displacement from the first speed to the second speed will now be described. At first, the lever 16 is moved from the first speed position shown in FIG. 2 to $n_1$ and then the fixed contact point to which the movable contact point 66 for a shift operation is contacted is moved from the contact points 62a, 64a to 62b, 64b, resulting in that the shift fork in the gear shift unit D causes the speed-change condition of the transmission C to be displaced from the first speed condition to $n_2$ neutral condition, the switch 90 is closed under an output from the signal processing unit B and then the compressed air is supplied again to the air cylinder 72. Then when the lever 16 is moved from $n_1$ to $n_2$, the engaged condition of the transmission C is displaced from $n_1$ neutral position to $n_2$ neutral position. Further, when the lever 16 is displaced from $n_2$ to the second speed, the energized fixed contact point, as the shift shaft 10 is rotated, is moved from 62b, 64b to 62c, 64c to cause the speed-change operation of the transmission C by the shift fork to be initiated. Also in this case, since the cam body 70 is operated to descend the piston rod 74 similarly to the case in which the above-mentioned lever is displaced from $n_1$ to the first speed, a high reaction force is applied to the hand or fingers holding the lever 16 until the shifting to the second speed of the transmission C is completed, the displacement operation of the lever 16 is interfered with and then upon completion of the shifting to the second speed, said interference action is controlled to cause the lever 16 to be displaced smoothly to the second speed position. Speed changing operation to other stages of the transmission is similarly performed as above. Therefore, when the operator moves the lever 16 to perform a speed-change operation, a high reaction force is applied against the displacement of the lever 16 due to the presence of compressed air in the air cylinder 72 until the speed-change operation of the transmission C is completed, and in turn upon completion of the speed-change operation of the transmission C, the air cylinder 72 is discharged to the surrounding atmosphere to diminish almost all of the reaction forces, so that the operator can be apprised of the completion of the speed-change operation of the transmission in view of a rapid reduction in resistance to the moving operation of the lever 16 and upon completion of the speed-change operation, the operator can direct his attention to other operating functions without being concerned with a speed-change operation. And in this case, a sense of touch of the operator's hand is utilized to detect a completion of the speed-change operation of the transmission C, so that his sense of sight and hearing can be applied to assure safety in operation of the vehicle to enable a quite safe driving operation.

Figure 9:
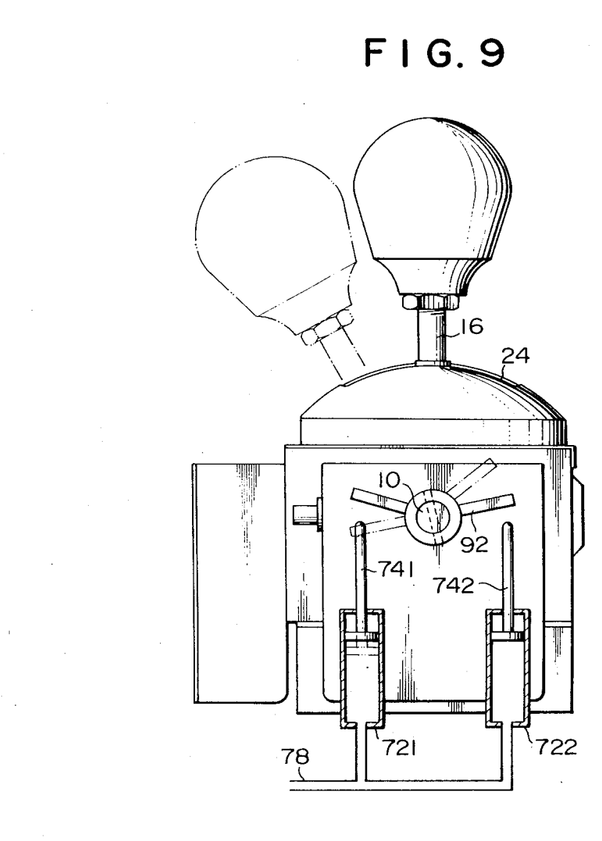
FIG. 9 is an elevational view for showing a second preferred embodiment of the present invention.
Figure 10:
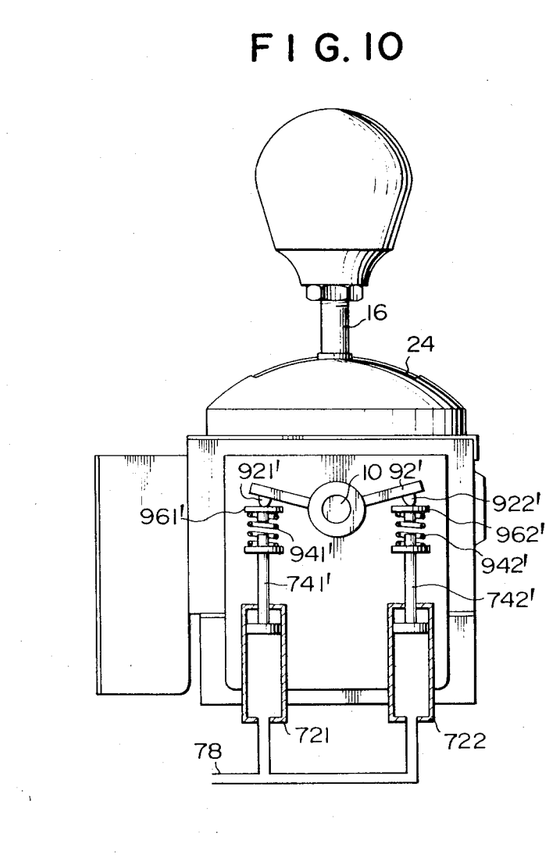
FIG. 10 is an elevational view for showing a third preferred embodiment of the present invention.

In the first preferred embodiment described above, the manual operating member is composed of the lever 16, connecting rod 14, shift shaft 10, oscillating member 58, movable contact point 66, oscillating member 34, shafts 36, 38, oscillating member 46 and movable contact point 54; a signal generating means is constructed by arranging each of the fixed contact points 62a, 62b, 62c and 64a, 64b, 64c, and the fixed contact points 50a, 50b, 50c and 52a, 52b, 52c midway of the moving passage of the movable contact points 66 and 54; an interference means is constructed by arranging the cam body 70 on the shift shaft 10 and abutting against the cam body 70 the piston rod 74 of the air cylinder 72 containing supplied compressed air through roller 76; control means is constructed by the solenoid valve 80 releasing the compressed air contained in the air cylinder 72 to the surrounding atmosphere and by the switch 90 for operating the valve 80; and the signal processing unit B having a shift completion signal of the transmission fed thereto is applied as a sensor means. In construction of the interference means, the arrangement in which the cam body 70 is applied and one air cylinder 72 is applied can be alternatively replaced with two air cylinders 721 and 722 as shown in FIG. 9, and in the alternative arrangement, a clearance between the oscillating member 92 fitted to the shift shaft 10 and the upper ends of the piston rods 741 and 742 (when the compressed air is supplied), when the lever 16 is at a neutral position in its shifting direction, may provide an operational feeling to the operator that when the lever 16 is moved from the neutral position to another position in the shifting direction, the lever 16 feels heavy suddenly after the oscillating member 92 is abutted against the upper ends of the piston rods 741 and 742, and upon completion of the speed-change operation of the transmission C, the lever again feels light immediately. As shown in FIG. 10, if the arrangement of the second preferred embodiment of FIG. 9 is slightly modified to arrange the springs 941' and 942' as resilient (or elestic) bodies in the clearance and the projections 921' and 922' of the oscillating member 92' are contacted by the spring receivers 961' and 962' when the lever 16 is at its neutral position, the operator may have an operational feeling that the lever 16 feels gradually heavy in a range from the neutral position to the abutted position between the oscillating member 92' and the piston rods 741', 742' when the lever 16 is moved from the neutral position in a shift direction and feels rapidly heavy at the abutting position, and then upon completion of the speed-change operation of the transmission C the lever feels rapidly light again.

Figure 11:
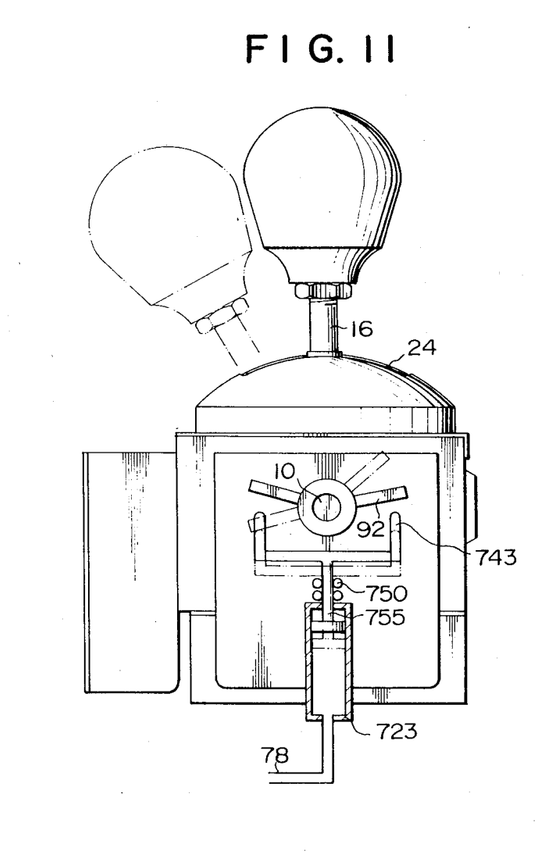
FIG. 11 is an elevational view for showing a fourth preferred embodiment of the present invention.
Figure 12:
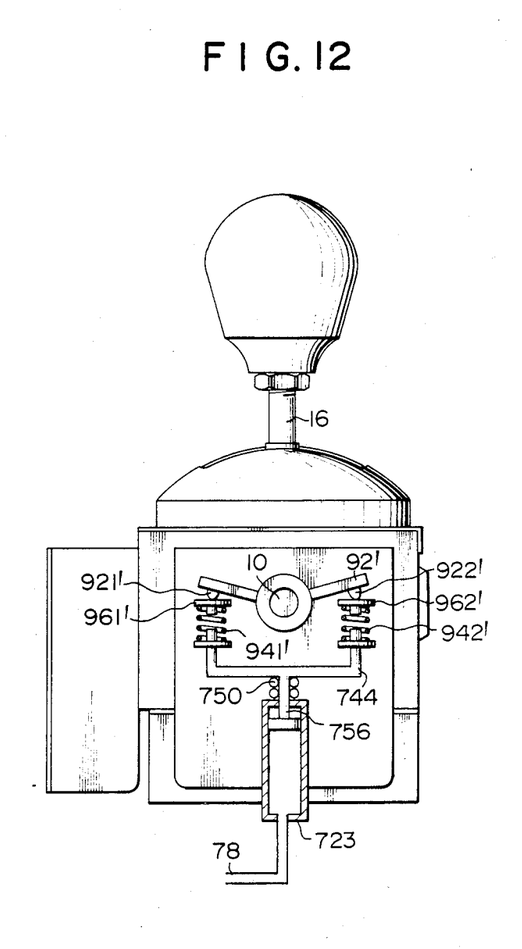
FIG. 12 is an elevational view for showing a fifth preferred embodiment of the present invention.

In FIG. 11 is shown the fourth preferred embodiment in which the construction of the second preferred embodiment shown in FIG. 9 is somewhat modified. Arm member 743 with a substantial -shaped section facing against the oscillating member 92 is connected to the piston rod 755 of an air cylinder 723, and the piston rod 755 is supported by rollers 750. Further, in FIG. 12 is shown the fifth preferred embodiment in which the construction of the third preferred embodiment shown in FIG. 10 is somewhat modified. In the embodiment of FIG. 12, similarly to that of FIG. 11, an arm member with a substantial -shaped form 744 is connected to the piston rod 755 of an air cylinder 723. In the fourth and fifth preferred embodiments, only one air cylinder is needed compared to that of the second and third preferred embodiments, resulting in making an effect of reduction in cost.

In the first preferred embodiment described above, the operational feeling applied by the lever 16 during its speed-change operation can be obtained optionally by properly designing the shape of the lower surface of the cam body 70.

In the first to fourth preferred embodiments above and in the fifth preferred embodiment shown in FIG. 12, the interference means is constructed such that it acts upon the manual operating member only when the transmission is displaced from its neutral condition to the speed-change conditions such as the first and second speeds other than the neutral one. This arrangement can be modified such that the interference means is acted upon when the transmission is displaced from its speed-change conditions other than the neutral one to its neutral condition and it may be acted upon in both cases.

It is apparent that the operating device for a transmission of the present invention is not limited to the vehicle shown in the preferred embodiment above, but is effective for general machinery.

Having described the invention as related to the embodiments shown in the accompanying drawings, it is our intention that the invention be not limited by any of the details of description, unless otherwise specified, but rather be construed broadly within its spirit and scope as set out in the accompanying claims.

What is claimed is:

1. An operating device for a transmission comprising:
   a manual operating member movable selectively along an operating pattern consisting of a passage of a selecting direction and a plurality of shift directions;
   signal generating means for generating an instruction signal corresponding to an operation of said manual operating member by detecting movement of said manual operating member to effect a speed change,
   signal processing means for generating a speed change signal in response to said instruction signal,
   gear shift means for changing the condition of the transmission in response to said speed change signal from said signal processing means,
   interference means engageable with said manual operating member and applying to said manual operating member a reaction force to interfer with but not prevent speed change movement of said manual operating member,
   sensing means for detecting the condition of said transmission and outputting a signal when the transmission has been shifted to the condition corresponding to said speed change signal, and
   control means for controlling the reaction force of said interference means according to the output signal of said sensing means,
   said control means being constructed to release the reaction force of said interference means when said sensing means detects that said transmission has been shifted to the condition corresponding to said speed change signal in order to complete a shift as a result that said manual operating member moves along a selected shift direction.

2. An operating device for a transmission according to claim 1, in which,
   said interference means comprises a source of working fluid and a fluid cylinder operated by means of fluid from said source of working fluid to interfer with movement of said manual operating member,
   said control means comprising a solenoid valve disposed between said source of working fluid and said fluid cylinder and a switch controlling said solenoid valve, and
   said solenoid valve being operable under control of said switch to discharge said fluid from said fluid cylinder to release the interference action of said interference means on said manual operating member when said sensing means detects that the condition of the transmission has been changed to the condition corresponding to said speed change signal.

3. An operating device for a transmission according to claim 2, in which
    said manual operating member comprises a lever pivotally mounted on a rotatable shift shaft with the pivot axis of said lever perpendicular to the axis of said shift shaft, and
    said interference means comprises a rotation member on, and rotating with, said shift shaft engageable by a part movable by a piston of said fluid cylinder to interfer with rotation of said rotation member and thus with rotation of said shift shaft.

4. An operating device for a transmission according to claim 3, in which
    said rotation member comprises a cam body against which said part movable by said piston abuts.

5. An operating device for a transmission according to claim 4, in which
    said part movable by said piston of said fluid cylinder comprises a roller carried by a piston rod of said piston and rollable on said cam body.

6. An operating device for a transmission according to claim 1, in which
    said manual operating member comprises a lever pivotally mounted on a shift shaft with the pivot axis of said lever perpendicular to the axis of said shift shaft, and
    said interference member comprises an oscillating member on said shift shaft, and rotating therewith, and extending transversely of said shift shaft and two fluid cylinders disposed symmetrically with respect to axis of said shift shaft and having pistons engageable with said oscillating member to interfer with rotation of said oscillating member and thus with rotation of said shift shaft.

7. An operating device for a transmission according to claim 6, in which
    there is a clearance between said pistons and said oscillating member when said manual operating member is in its neutral position.

8. An operating device for a transmission according to claim 6, in which
    resilient means is interposed between said pistons of said fluid cylinders and said oscillating member.

9. An operating device for a transmission according to claim 1 in which,
    said manual operating member comprises a lever pivotally mounted on a shift shaft rotable in housing, said lever being movable along guide passages in said housing, and
    said interference means comprises an oscillating member mounted on and rotating with said shift shaft and having two arms projecting from the axis of said shift shaft and an abutment member carried by a piston rod of said fluid cylinder and having portions engageable respectively with said arms of said oscillating member to interfer with rotation of said oscillatable member and thus with rotation of said shift shaft.

10. An operating device for a transmission according to claim 9, in which,
    there is a clearance between said abutment member and said oscillating member when said manual operating member is in its neutral position.

11. An operating device for a transmission according to claim 9, in which resilient bodies are arranged between said abutment member and said oscillating member.

12. An operating device for a transmission comprising:
    a manually operable shift lever movable in a predetermined pattern to a plurality of shift positions,
    signal generating means operable by movement of said shift lever to generate a gear charge instruction signal corresponding to movement of said shift lever,
    signal processing means receiving said instruction signals and generating a speed change signal in response to said instruction signal,
    gear shift means for changing the condition of the transmission in response to said speed change signal received from said signal processing means,
    interference means for applying to said shift lever a reaction force opposing but not preventing manual movement of said shift lever to a shift position corresponding to a selected speed change,
    sensing means for detecting the condition of said transmission and outputting a signal when the transmission has been shifted to the condition corresponding to said speed change signal for the selected speed change, and
    control means, responsive to said sensing means, for reducing the reaction force applied by said interference means to said shift lever when said sensing means detects that a change of the condition of the transmission to the condition corresponding to said speed change signal has been completed, thereby providing a tactil signal that a shift has been completed.

* * * * *